Feb. 8, 1955 A. ROLFES 2,701,509
AGRICULTURAL IMPLEMENT HAVING A VERTICALLY ADJUSTABLE
IMPLEMENT CARRYING FRAME WITH ADJUSTABLY
MOUNTED IMPLEMENT SUPPORTS
Filed Feb. 20, 1953 3 Sheets-Sheet 3
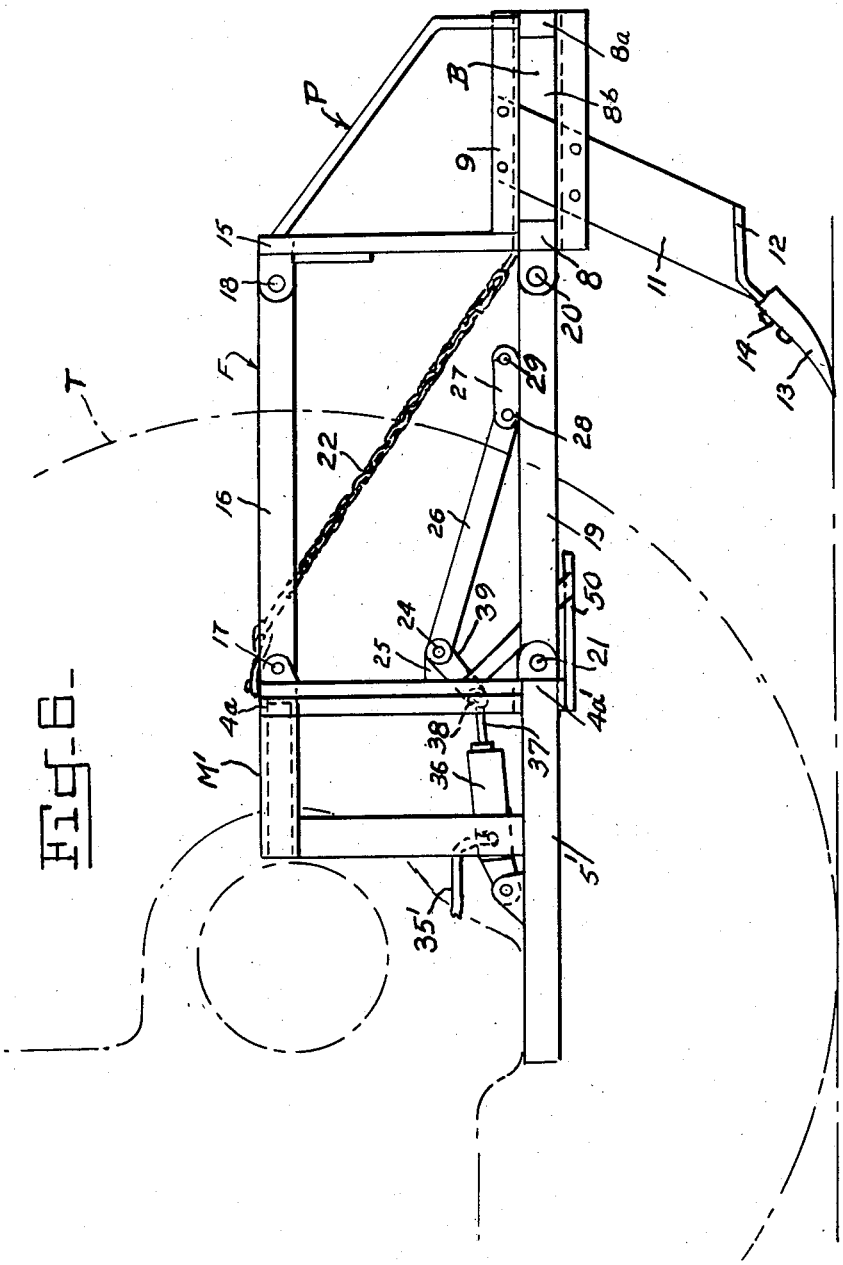
INVENTOR
August Rolfes,
BY
ATTORNEY United States Patent Office 2,701,509
Patented Feb. 8, 1955

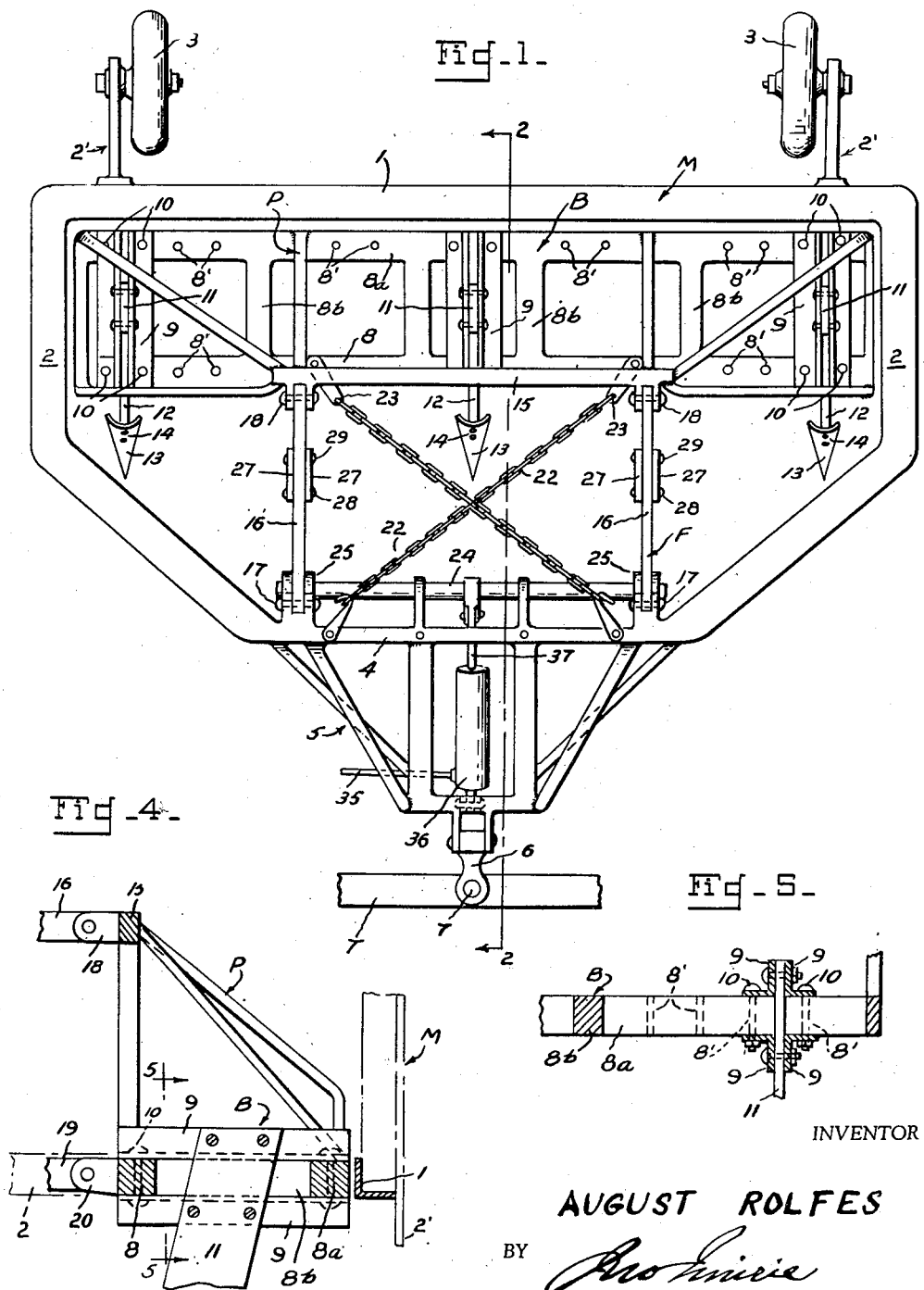

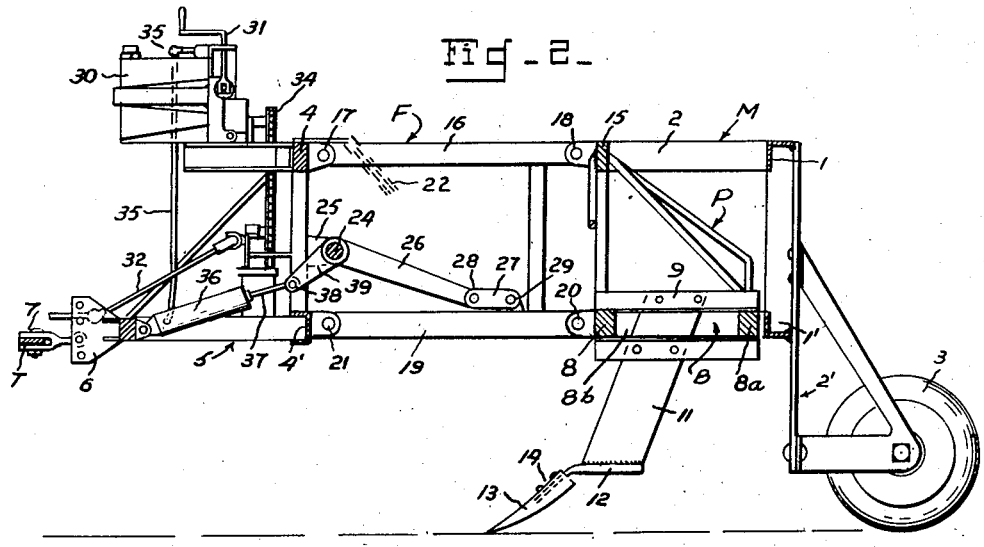
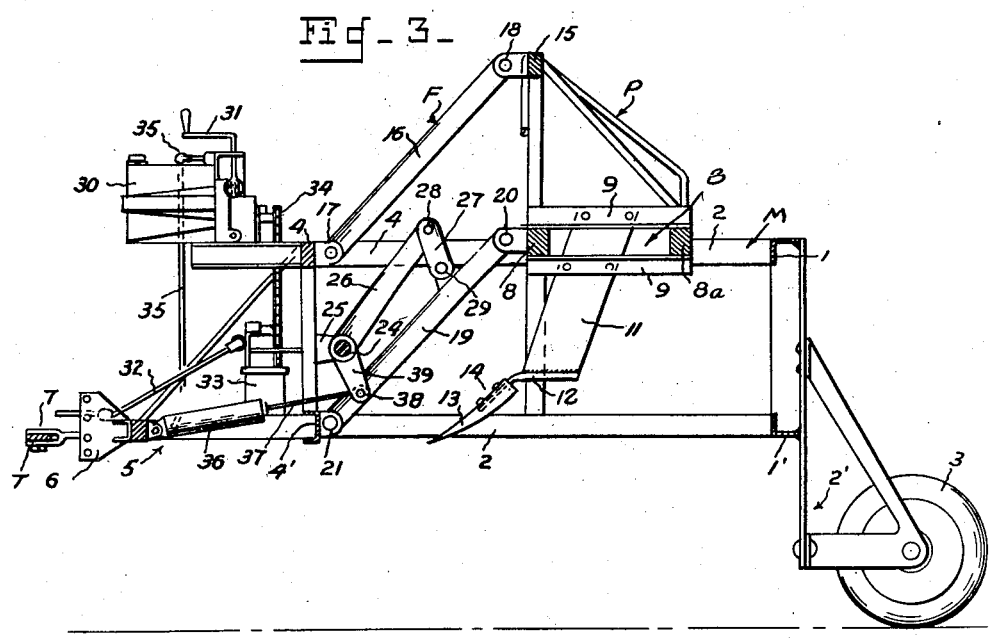

2,701,509

AGRICULTURAL IMPLEMENT HAVING A VERTICALLY ADJUSTABLE IMPLEMENT CARRYING FRAME WITH ADJUSTABLY MOUNTED IMPLEMENT SUPPORTS

August Rolfes, Mattituck, N. Y.

Application February 20, 1953, Serial No. 338,072

2 Claims. (Cl. 97—46.27)

The present invention relates to agricultural implements, and more specifically to gang plows, harrows, diggers, and other cultivators, having a vertically adjustable tool-frame.

It is an object of the invention to provide an implement-lift for elevating the tool-frame of a gang plow or the like to inoperative position for transportation purposes, and for adjusting the depth of the plows to desired working positions in the ground to be plowed.

It is another object of the invention to provide a vertically adjustable support for a plow frame by which the frame is suspended in constantly level position.

It is a further object of the invention to provide an adjustable but rigid support for the individual plows of the gang.

The implement-lift includes a minimum number of parts that may be manufactured with facility and low cost of production, and the parts may be assembled with convenience to insure a strong, rugged and durable mechanism that may be manipulated with ease, and which is efficient in the performance of its functions.

The novel features that are considered characteristic of the invention are set forth with particularity in the appended claims. The invention itself, however, both as to its organization and its method of operation, together with additional objects thereof, will best be understood from the following description of specific embodiments thereof when read in connection with the accompanying drawings, wherein:

Figure 1 is a top plan view of a tractor-towed mobile agricultural implement in accordance with the present invention;

Figure 2 is a cross sectional view taken on line 2—2 of Figure 1 and showing the plow or cultivator implements in operative position;

Figure 3 is a cross sectional view corresponding to Figure 2 but showing the plow or cultivator implements in elevated position for transportation;

Figure 4 is an enlarged fragmentary cross sectional view of the implement supporting frame and illustrating the manner of adjustably supporting the individual implements;

Figure 5 is a fragmentary cross sectional view taken on line 5—5 of Figure 4; and Figure 6 is a side view in elevation of a tractor mounted implement in accordance with the invention.

The accompanying drawings illustrate a complete example of a practical application of the principles of the invention as physically embodied in a gang plow, but it will be understood that changes and alterations are contemplated and may be made in these mechanical structures within the scope of the claims without departing from the principles of the invention.

Referring now to the drawings, specifically to Figures 1–3, a tractor-towed mobile implement in accordance with the invention comprises a generally rectangular, open, main frame M, having vertically spaced upper and lower cross bars 1, 1', of angle irons, to which are attached a pair of laterally spaced wheel-mounts 2', 2', that depend from the rear end of the main frame, and a pair of supporting wheels 3, 3, are journaled in the lower ends of the wheel-mounts.

The main frame M has pairs of side bars 2—2 that are parallel at the rear and converge at the front of the implement and terminate in upper and lower cross bars 4 and 4'. These front shortened cross bars form parts of an angular forwardly projecting coupling frame 5 that is diagonally braced and equipped at its front end with a clevis 6 for use with a link and pin coupling 7 that connects the wheeled implement to the draw bar at the rear end of a towing tractor, indicated at T.

By means of the rear wheels and the front coupling, the main frame is supported in substantially horizontal position, and the tractor is employed for towing or propelling the wheeled implement. The upper and lower horizontal portions of the main frame are united by suitable posts and braces to afford an open structure within which a vertically adjustable tool-frame or plow-frame P is centered and pivotally suspended, and a suitable number of laterally spaced and adjustable plows are adjustably but rigidly mounted to depend from the plow frame.

The plow frame P is in the form of a transversely extending truss including a lower base frame B and an upper cross bar 15, which are rigidly connected by uprights and angularly disposed braces. The base frame B comprises two spaced parallel front and rear transverse beams 8 and 8a rigidly connected by short beams 8b, each of said transverse beams having a plurality of corresponding pairs of bolt holes 8' vertically therethrough. A plurality of tool supporting angle-bar cross heads 9 are mounted in superimposed pairs above and below the base frame B and bridging the transverse beams 8 and extending in a direction parallel with the direction of travel of the implement.

The angle bars of the cross heads have base flanges with bolt holes in the ends thereof and by which they are secured by bolts 10 extending through the holes 8' in the transverse beams 8 and 8a. By this arrangement, the cross heads may be selectively positioned transversely of the base frame B in accordance with the distance desired between the rows or furrows. The angle bars also have vertical flanges and the bars are mounted in pairs with the vertical flanges disposed toward each other and in spaced relation to snugly receive a tool standard 11 between each pair.

The vertical flanges and the tool standards 11 are provided with corresponding bolt holes so that the standards may be removably and, if desired, adjustably mounted. The tool standards 11 are rigidly supported and braced by the superimposed pairs of bars of the cross heads 9 and are secured in an upright position and depending from the base frame B. Forwardly projecting shoes 12 are provided on the lower ends of the tool standards 11, and plows, harrows or cultivators 13 are removably secured on these shoes 12 by bolts 14.

Plow frame P is suspended within the open main frame M for vertical adjustment by means of a flexible suspension frame F connected between the front cross bars 4, 4', of the main frame and the base frame B and cross bar 15 of the plow frame. The flexible suspension frame F is of generally rectangular shape and includes an upper pair of laterally spaced suspending links 16, 16, which at their ends are connected by pivots 17 and 18 respectively with bearing brackets on the respective cross bars 4 and 15. A complementary lower pair of suspending links 19, 19, of the suspension frame are connected by pivots 20 and 21 respectively with bearing brackets on the front edge of the base frame B and the front lower cross bar 4' of the main frame respectively.

These two pairs of parallel links thus form the flexible suspension frame that suspends the plow frame P from the front portion of the main frame M in a constantly level position and with the plows in operative position. For guiding the vertical movement of the plow frame and for restraining it against lateral movements, a pair of diagonally arranged cross chains 22, 22, are anchored at their respective ends by bolts as 23 to the upper cross bar 4 of the main frame and the base frame B of the plow frame.

The implement-lift or suspension frame is swung in a vertical plane to raise and lower the plow frame and plows through the rocking movement of a transversely arranged rock shaft 24 journaled in bearings 25 mounted upon upright parts or posts of the main frame, and this rock shaft is equipped with a pair of laterally spaced rearwardly extending levers 26, 26, rigid with the shaft. The rear free ends of these levers are each connected by pivots 28 with a link 27, and each of these links is connected by a pivot 29 to the respective lower link 19 of the flexible suspension frame F to provide a flexible lever joint.

The rock shaft 24 is actuated or oscillated in its bearings by fluid-pressure operated mechanism, and preferably an hydraulic pump 30 is mounted upon the front portion of the main frame for this purpose, and manually controlled by valve devices through the use of a hand crank 31.

The pump 30 may be driven by means of power transmission mechanism including a flexible operating shaft 32 receiving power and motion from and coupled to the power take-off of the tractor T, and power is transmitted from the operating shaft through gearing in a gear case 33 mounted on the main frame, and thence by chain and sprocket gearing 34 to the pump or compressor.

From the manually controlled pump or compressor, fluid power is transmitted through pipe 35 to a servo-motor mounted in the main frame and including a cylinder 36 and its piston rod 37 located in a plane parallel with the direction of travel of the implement.

The cylinder 36 of the servo-motor is pivotally mounted on the forwardly extending frame 5 and the piston rod 37 is by a pivot 38 to a crank 39 rigid with and depending from the central portion of the rock shaft 24. The compressor assembly includes readily accessible control and retaining means for the application of power to the lever mechanism to vertically adjust the plow frame, and to hold the suspension frame and the plow frame in desired adjusted positions.

In action, the four links of the suspension frame which are constantly maintained in parallelism are mounted on the main frame to afford widely distributed pivotal supports, and the rear ends of the four links also provide widely distributed suspension bearings for the plow frame to insure a stabilized plow frame that is constantly held with its base frame in level position.

An implement incorporating the present invention may also be adapted to be mounted directly on a tractor T between the rear wheels thereof, as shown in Figure 6. In this modification, the structure and actuation of the plow frame P is identical to the previously described modification, but the main frame M' comprises only a small structure to support the upper and lower cross bars 4a and 4a' which correspond to the cross bars 4 and 4' of the prior modification.

According to this modification, the main frame M' and/or the forward frame 5' are adapted to be mounted directly to the frame of the tractor T. In addition, the fluid line 35', connected with the cylinder 36, may be connected to the hydraulic system of the tractor. The particular mounting of the implement on the tractor necessarily varies according to the make and model of the tractor. In some cases, the tractor draw bar is removed and it may be supplemented by a draw bar 50 secured on the cross bar 4a' and braced to the frame M'.

Although certain specific embodiments of the invention have been shown and described, it is obvious that many modifications thereof are possible. The invention, therefore, is not to be restricted except insofar as is necessitated by the prior art and the spirit of the appended claims.

This application is a continuation-in-part of application filed April 3, 1950, Serial No. 153,549, and now abandoned.

What I claim is:

1. In the power propelled agricultural implement described, the combination which includes a main frame having upper and lower parallel relatively spaced cross bars, a coupling frame on the lower of said cross bars for supporting said main frame in a substantially vertical position, a vertically adjustable tool frame suspended from said main frame and having a horizontally disposed base frame and an elevated cross bar rigid with the base frame, said base frame including spaced rigidly connected front and rear transverse beams, each having a plurality of corresponding pairs of bolt holes, a plurality of angle bar cross heads in superimposed pairs above and below said base frame and bridging the transverse beams thereof, said cross heads having vertical flanges and base flanges with bolt holes in the ends of the base flanges and being secured by bolts inserted through said bolt holes in said transverse beams to selectively position said cross heads in spaced superimposed pairs with the vertical flanges on the adjacent sides thereof and spaced to receive tool standards therebetween in an upright position and depending from said base frame, a flexible suspension frame, said suspension frame comprising upper and lower pairs of laterally spaced suspending links pivotally connecting the upper and lower cross bars of said main frame to the base frame and elevated cross bar of the tool frame for relative movement in relation to each other, a pair of diagonally arranged cross chains connected at their respective ends to the upper cross bar of said main frame and the base frame of said tool frame for guiding the vertical movement of the tool frame and for restraining the tool frame against lateral movement, a transversely extending rock shaft journaled on said main frame, a pair of rearwardly extending levers rigid with the shaft, a link pivotally connected to each of said levers and to the lower suspending links, a fluid pressure operated mechanism mounted on the main frame, and a crank arm rigid with the shaft and connected to said pressure operated mechanism for the raising and lowering of said suspension frame and tool frame through rocking motion of said shaft.

2. In the power propelled wheeled agricultural implement described, the combination which includes a main frame having upper and lower rear parallel relatively spaced cross bars, a pair of laterally spaced wheel mounts depending from and secured to said rear cross bars adjacent the outer ends thereof, a supporting wheel journaled in each wheel mount, pairs of relatively spaced side bars connected to the outer ends of said upper and lower rear cross bars, upper and lower front cross bars connected to the forward ends of said side bars and a coupling frame on said lower front cross bars for supporting said frame in a substantially horizontal position, a vertically adjustable tool frame having a horizontally disposed base frame and an elevated cross bar rigid with the base frame, said tool frame being suspended within said main frame, a flexible suspension frame, said suspension frame comprising upper and lower pairs of laterally spaced suspending links pivotally connecting the upper and lower front cross bars of said main frame to the base frame and elevated cross bar of the tool frame for relative movement in relation to each other, a pair of diagonally arranged cross chains connected at their respective ends to the upper cross bar of said main frame and the base frame of said tool frame for guiding the vertical movement of the tool frame and for restraining the tool frame against lateral movement, a transversely extending rock shaft journaled on the forward end of said main frame, a pair of rearwardly extending levers rigid with the shaft, a link pivotally connected to each of said levers and to the lower suspending links, a fluid pressure operated mechanism mounted on the main frame, and a crank arm rigid with the shaft and connected to said pressure operated mechanism for the raising and lowering of said suspension frame and tool frame through rocking motion of said shaft.

References Cited in the file of this patent

UNITED STATES PATENTS

| | | |
|---|---|---|
| 2,403,360 | Graham | July 2, 1946 |
| 2,444,321 | Wooldridge | June 29, 1948 |
| 2,593,679 | Kaupke | Apr. 22, 1952 |

FOREIGN PATENTS

| | | |
|---|---|---|
| 302,586 | Italy | Nov. 2, 1932 |